US012372418B2

United States Patent
Pilant et al.

(10) Patent No.: US 12,372,418 B2
(45) Date of Patent: Jul. 29, 2025

(54) METHOD OF SHIELDING CAPACITIVE PRESSURE SENSOR

(71) Applicant: Sporian Microsystems, Inc., Lafayette, CO (US)

(72) Inventors: Evan Pilant, Longmont, CO (US); Dale Schoonover, Louisville, CO (US); Jakob Oreskovich, Boulder, CO (US); Brittany McGrogan, Denver, CO (US); William VanHoose, Aurora, CO (US)

(73) Assignee: Sporian Microsystems, Inc., Lafayette, CO (US)

( * ) Notice: Subject to any disclaimer, the term of this patent is extended or adjusted under 35 U.S.C. 154(b) by 0 days.

(21) Appl. No.: 18/437,970

(22) Filed: Feb. 9, 2024

(65) Prior Publication Data

US 2024/0210257 A1    Jun. 27, 2024

Related U.S. Application Data

(62) Division of application No. 17/213,522, filed on Mar. 26, 2021, now Pat. No. 11,940,336.

(51) Int. Cl.
*G01L 1/14*          (2006.01)
(52) U.S. Cl.
CPC ..................................... *G01L 1/14* (2013.01)
(58) Field of Classification Search
CPC ....... G01L 19/069; G01L 1/14; G01L 9/0072; G01L 13/026
See application file for complete search history.

(56) References Cited

U.S. PATENT DOCUMENTS

| 3,244,000 | A |   | 4/1966 | Ballard |
| 4,935,841 | A | * | 6/1990 | Jonsson ................ G01L 9/0075 361/283.4 |
| 5,920,015 | A | * | 7/1999 | Hallberg .............. G01L 9/0075 361/283.4 |
| 6,439,056 | B1 | * | 8/2002 | Jonsson ................ G01L 9/0075 73/708 |
| 6,672,171 | B2 |   | 1/2004 | Gu et al. |
| 6,681,630 | B1 | * | 1/2004 | Kumada ............ G01C 19/5649 73/504.12 |

(Continued)

FOREIGN PATENT DOCUMENTS

| CN | 109269681 A | 1/2019 |
| EP | 2525218 A1 | 11/2012 |
| JP | 04089562 A | 3/1992 |

OTHER PUBLICATIONS

Bull, Kevin, "Methods of Accurately Measuring Capacitive RH Sensors", Veriteq Instruments, Inc., Richmond BC, Canada, 5th International Symposium on Humidity and Moisture—ISHM 2006 Brazil, May 2-5, 2006, Rio de Janeiro, Brazil.

(Continued)

*Primary Examiner* — Tran M. Tran
(74) *Attorney, Agent, or Firm* — James R. Young; Cochran Freund & Young LLC

(57) ABSTRACT

A method of shielding a capacitive pressure transducer by positioning an insulated shield spacer between the capacitor electrodes, covering the two electrodes with an electrically conductive shield box, applying a sensor voltage from a first voltage source across the two electrodes, and applying a shield voltage from a second voltage source to the insulated shield spacer and to the shield box.

1 Claim, 11 Drawing Sheets

(56) References Cited

U.S. PATENT DOCUMENTS

| | | | | |
|---|---|---|---|---|
| 7,317,317 | B1 * | 1/2008 | Vermeire | G01N 27/02 |
| | | | | 324/629 |
| 7,332,902 | B1 * | 2/2008 | Vermeire | G01N 27/07 |
| | | | | 204/451 |
| 8,149,002 | B2 * | 4/2012 | Ossart | G01B 7/08 |
| | | | | 324/688 |
| 8,841,920 | B2 * | 9/2014 | De Boer | G01D 3/036 |
| | | | | 324/662 |
| 8,847,576 | B1 | 9/2014 | Hanning et al. | |
| 8,928,329 | B2 | 1/2015 | Downing et al. | |
| 9,445,202 | B1 | 9/2016 | Chyzhov | |
| 9,778,294 | B2 * | 10/2017 | Iida | G01R 19/175 |
| 9,829,405 | B2 * | 11/2017 | Kuisma | G01L 9/0072 |
| 10,239,747 | B2 * | 3/2019 | Sato | G01L 9/0047 |
| 10,267,700 | B2 * | 4/2019 | Teipen | G01L 19/04 |
| 10,425,079 | B1 * | 9/2019 | Bytheway | H03K 17/955 |
| 11,692,893 | B2 * | 7/2023 | Niwa | G01L 9/0073 |
| | | | | 73/724 |
| 11,983,362 | B2 * | 5/2024 | Iikura | G01B 7/00 |
| 12,272,899 | B2 * | 4/2025 | Marzano | H01G 4/232 |
| 2003/0132418 | A1 | 7/2003 | Kwon et al. | |
| 2010/0127832 | A1 | 5/2010 | Pischek et al. | |
| 2015/0145074 | A1 | 5/2015 | Kolb et al. | |
| 2015/0268115 | A1 | 9/2015 | Robert et al. | |
| 2018/0172535 | A1 | 6/2018 | Harsh et al. | |
| 2020/0400477 | A1 | 12/2020 | Harsh et al. | |

OTHER PUBLICATIONS

Martin, Jeremy et al., "Integration of siCN as a Low k Etch Stop and Cu Passivation in a High Performance Cu/Low k Interconnect", Advanced Micro Devices, AMD/Motorola Alliance, 3501 Ed Bluestein Blvd., Austin, TX 78721/Motorola, Dan Noble Center, 3501 Ed Bluestein Blvd., Austin TX 78721.

* cited by examiner

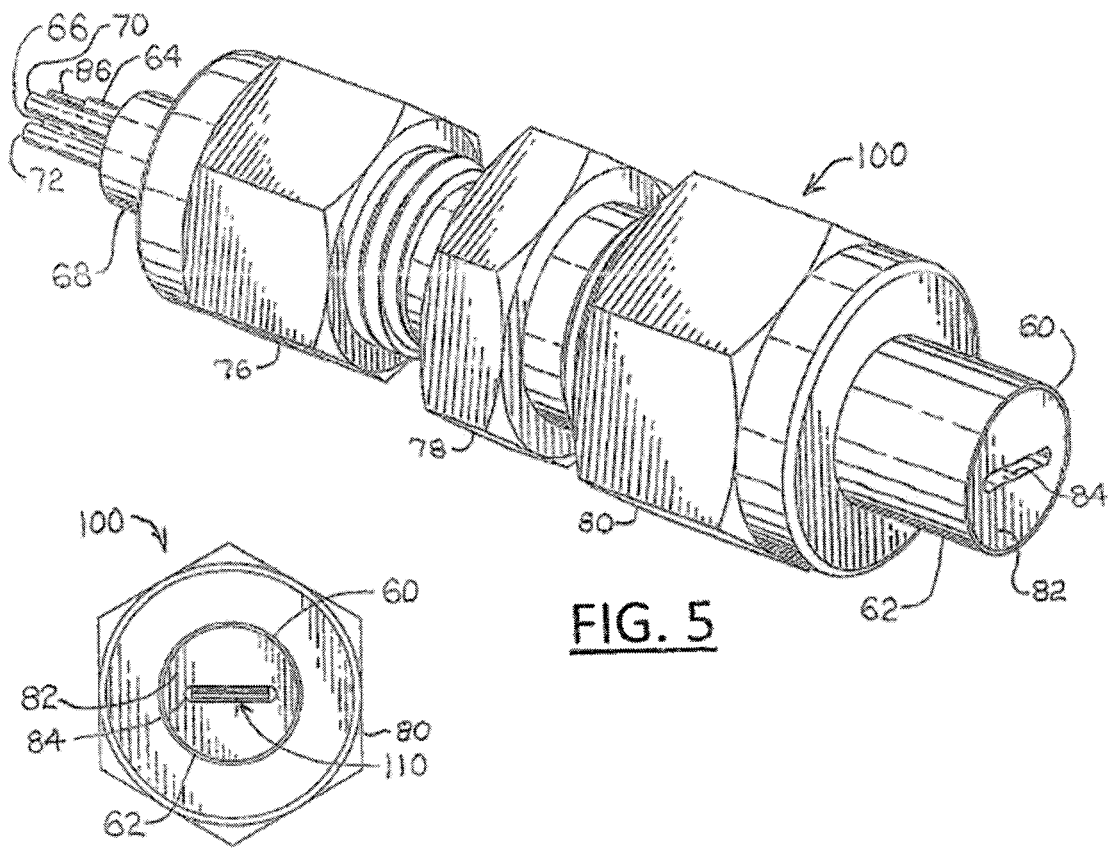
FIG. 5
FIG. 6
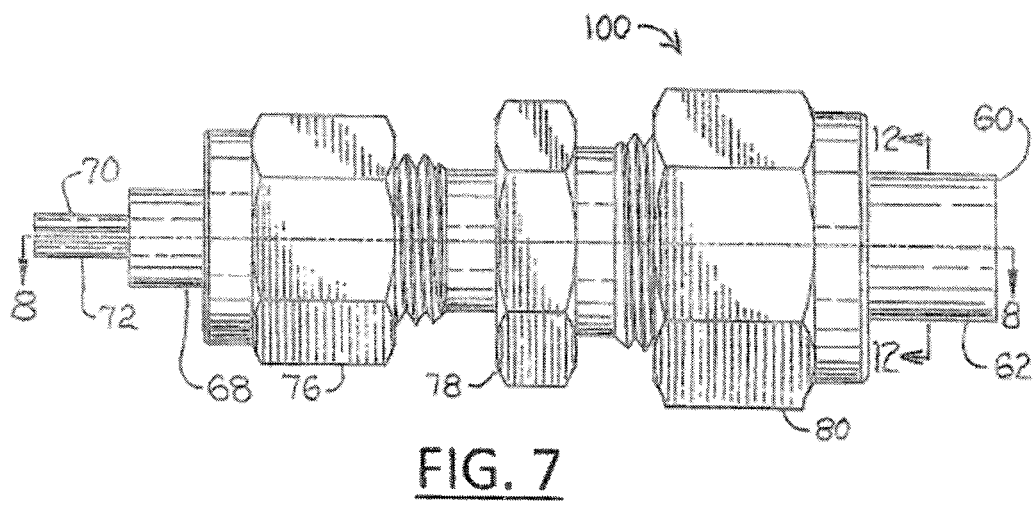
FIG. 7

METHOD OF SHIELDING CAPACITIVE PRESSURE SENSOR

GOVERNMENT LICENSE RIGHTS

This invention was made with government support under Contract No. 80NSSC19C0162 awarded by the United States National Aeronautics and Space Administration. The government has certain rights in the invention.

BACKGROUND

Technical Field of the Invention

The present invention is related to pressure sensors, and more particularly to capacitive pressure transducers for detecting and measuring pressures, including pressures in very high temperatures and other harsh operating conditions.

State of the Prior Art

Capacitive pressure sensors can be effective pressure sensors for use in high temperatures, for example, as high as 1,800° C., sometimes even in corrosive, oxidizing, or reducing fluids, neutron flux, or other harsh conditions, for example, as described in the Patent Application Publication No. US 2020/0400477 A1, which is incorporated herein by reference for all that it discloses. However, improvements in accuracy, stability, and reliability are still desirable.

The foregoing examples of the related art and limitations related therewith are intended to be illustrative and not exclusive. Other limitations of the related art and other examples of related art will become apparent to those of skill in the art upon a reading of the specification and a study of the drawings.

SUMMARY

The following embodiments and aspects thereof are described and illustrated in conjunction with systems, tools, and methods which are meant to be examples and illustrative, not limiting in scope. In various embodiments and implementations, one or more problems have been reduced or eliminated, while other embodiments are directed to other improvements and benefits.

A capacitive pressure transducer for transducing pressures to electric signals comprises two electrodes positioned adjacent to each other with a gap between them, at least one of the two electrodes being resiliently deformable toward and away from the other of the two electrodes in response to pressure changes; and a spacer positioned between portions of the two electrodes to maintain the gap between the two electrodes, the spacer comprising an electrically conductive shield layer sandwiched between a first electrically insulative layer and a second electrically insulative layer.

In one embodiment, a sensor voltage is connected to one of the two electrodes, and a shield voltage is connected to the electrically conductive shield layer.

In another embodiment, the shield voltage is essentially equal in magnitude to the sensor voltage at all points in time.

Another embodiment includes an electrically conductive shield box around, but not in electrical connection with, the two electrodes, wherein the shield voltage is connected to the electrically conductive shield box.

A method of avoiding parasitic capacitances in a spacer between two electrodes of a variable capacitor comprises positioning a spacer between portions of the two electrodes, wherein the spacer comprises an electrically conductive shield layer sandwiched between a first electrically insulative layer and a second electrically insulative layer, covering the two electrodes with an electrically conductive shield box, applying a sensor voltage across the two electrodes from a first voltage source, and applying a shield voltage to the electrically conductive shield layer and to the electrically conductive shield box that is from a second voltage source and is essentially equal in magnitude to the sensor voltage at all points in time.

In one embodiment, the shield voltage creates a voltage difference between the electrically conductive shield layer and one of the two electrodes that is less or more than the sensor voltage across the two electrodes.

In another embodiment, the shield voltage is essentially equal in magnitude to the sensor voltage at all points in time.

In another embodiment, the method includes providing the sensor voltage via a center conductor of a shielded wire, and providing the shield voltage via an electrically conductive shield material around a periphery of the coax cable.

Pressure sensor apparatus, comprising a casing that has an interior and a distal end, a disk mounted at the distal end of the casing, said disk being flexible inwardly toward the interior of the casing and outwardly away from the interior of the casing, a pusher positioned in the interior of the casing in physical contact with the disk, and a capacitive pressure transducer comprising a first electrode positioned adjacent to a second electrode with a gap between them, and a spacer positioned between portions of the respective first and second spacer to maintain the gap, wherein the first electrode is flexible toward and away from the second electrode, and wherein the capacitive pressure transducer is mounted in the interior of the casing with the first electrode in physical contact with the pusher, and wherein the capacitive pressure transducer is adjustably movable toward and away from the disk.

In addition to the example aspects, embodiments, and implementations described above, further aspects, embodiments, and implementations will become apparent to persons skilled in the art after becoming familiar with the drawings and study of the following descriptions.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting. In the drawings:

FIG. 5 is an isometric view of an example capacitive pressure transducer equipped with an insulator-conductor-insulator spacer as illustrated diagrammatically in FIG. 1;

FIG. 6 is a distal end elevation view of the example capacitive pressure transducer in FIG. 5;

FIG. 7 is a side elevation view of the example pressure transducer in FIGS. 5 and 6;

DETAILED DESCRIPTIONS OF EXAMPLE EMBODIMENTS

Figure 1:
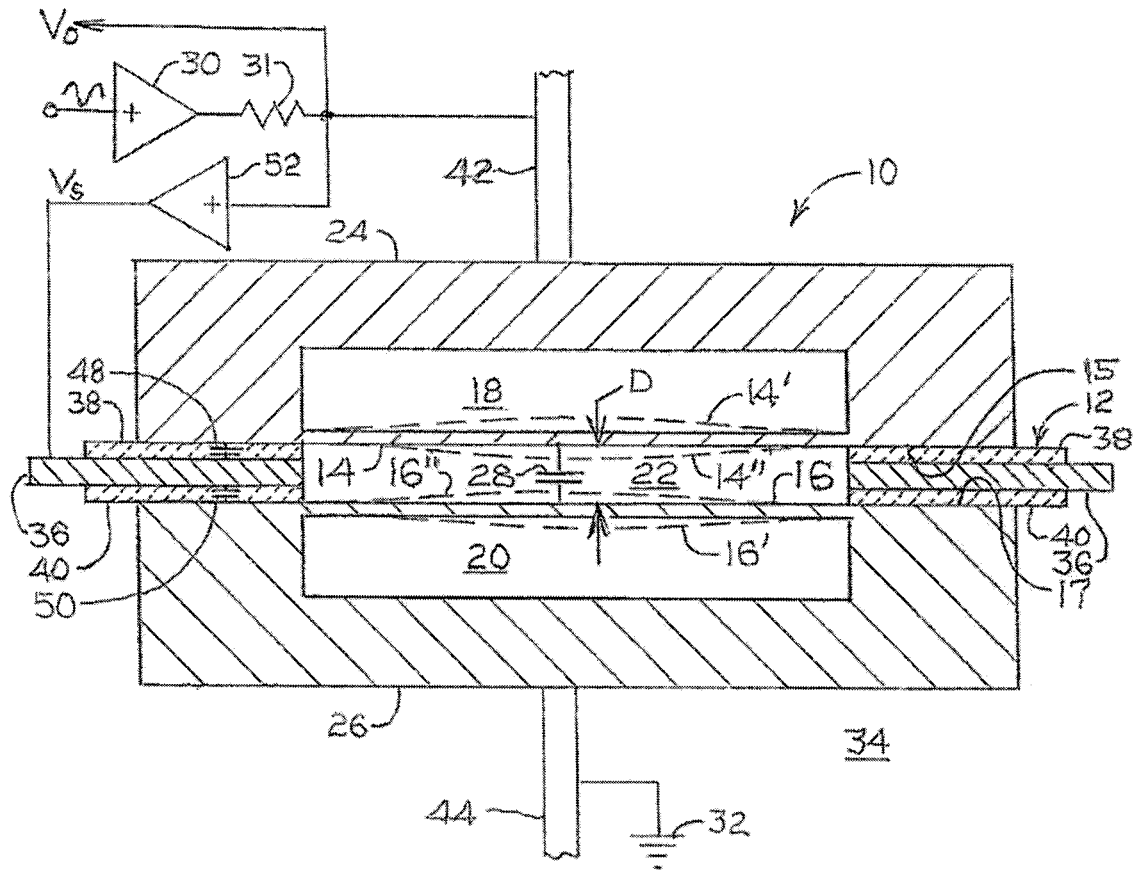
FIG. 1 is a diagrammatic view of an example capacitive pressure transducer illustrating driven shielding with an insulator-conductor-spacer holding capacitive plates apart from each other.

An example capacitive pressure transducer 10 with driven shielding provided by a layered insulator-conductor-insulator spacer 12 holding a pair of capacitor electrodes 14, 16 apart from each other is illustrated diagrammatically in FIG. 1. Persons skilled in the art understand that a capacitor is a device comprising one or more pairs of electrical conductors wherein the conductors in a pair of the conductors are separated by an insulator (dielectric material). The electrical conductors of a capacitor are sometimes called electrodes. Thin capacitor electrodes of a capacitor are sometimes called plates. The example capacitive pressure transducer 10 is illustrated in FIG. 1 as comprising a pair of capacitor electrodes 14, 16, wherein each of the capacitor electrodes 14, 16 is a portion of a respective housing that encloses a space, e.g., a first housing 24 that encloses a first space 18 and a second housing 26 that encloses a second space 20. Also in the example in FIG. 1, both of the first and second capacitor electrodes 14, 16 are illustrated as being elastic, resiliently deformable, and thin enough to flex inwardly 14', 16' and outwardly 14", 16" in relation to the respective first and second spaces 18, 20 in response to changes of pressure outside of the respective first and second spaces 18, 20 in relation to the pressures inside of the respective first and second spaces 18, 20 of the housings 24, 26.

In the example capacitive pressure transducer 10 in FIG. 1, the first housing 24 and the second housing 26 are positioned adjacent to each other with the first thin, elastic, resiliently deformable, electrode 14 and the second thin, elastic, resiliently deformable electrode 16 separated by a gap 22 of variable distance D, which varies as the thin, elastic, resiliently deformable electrodes 14, 16 flex toward 14", 16" or away from 14', 16' each other as a function of changes of the pressure outside the spaces 18, 20 in the housings 24, 26, e.g., in the gap 22. Since the capacitance between the thin, elastic, resiliently deformable electrodes 14, 16, illustrated as the capacitor symbol 28, is a function of the distance D between the thin, elastic, resiliently deformable electrodes 14, 16, the capacitance 28 also varies as a function of changes of the pressure in the gap 22. In this description, such thin, elastic, resiliently deformable electrodes may be referred to simply as "resiliently deformable electrodes" or "resiliently deformable plates" or simply "electrodes" or "plates" for convenience. However, while not shown in FIG. 1, only one of the electrodes 14, 16 has to be movable toward and away from the other for the capacitance 28 to be variable, one example of which will be illustrated and explained below. Therefore, while the terms "electrodes" or "plates" in this description may refer to resiliently deformable electrodes or resiliently deformable plates, "electrodes" and "plates" are generic terms and not limited to resiliently deformable electrodes or resiliently deformable plates unless so indicated in the context of the particular description. Also, references in this description to components as "first," "second," "third," or "fourth" are only for convenience in labeling and describing, but not limiting to any particular arrangement or order.

The first and second electrodes 14, 16 in FIG. 1 can be formed as integral parts of the respective first and second housings 24, 26, as shown in FIG. 1, or they can be formed as separate parts and then welded, adhered, or otherwise attached to the respective first and second housings 24, 26 (not shown in FIG. 1). The first and second electrodes 14, 16 illustrated in the example capacitive pressure transducer 10 in FIG. 1 are made with an electrically conductive material, for example, electrically conductive metal, to form and function as a variable sensor capacitor, as indicated by the capacitor symbol 28, in a resistance-capacitance (RC) electric circuit between a voltage source 30 and ground 32, as illustrated, for example, in FIG. 2. However, persons skilled in the art will recognize that the first electrode 14 or the second electrode 16, or both, could instead be made with a non-electrically conductive material (not shown) that is thin, elastic, and resiliently deformable when exposed to pressures as explained above and that is plated, coated, or otherwise covered with a thin film or sheet (not shown) of electrically conductive material that flexes along with the thin, elastic, and resiliently deformable, non-electrically conductive material to form the electrodes of the variable capacitor 28. Also, all of the electrically conductive components in the circuit, areas of which face areas of electrically conductive components across the gap 22 and across which the voltage is applied, form a part of the capacitor electrodes. For example, the peripheral edge portions 15 of the electrode 14 in FIG. 1 are electrically conductive and are part of the electrode 14, even though they are thicker portions of the housing 24 and not resiliently deformable. Likewise, the peripheral edge portions 17 of the electrode 16 are electrically conductive and are part of the electrode 16, even though they are thicker portions of the housing 26 and not resiliently deformable. Accordingly, when a voltage is applied to the electrically conductive housings 24, 26 across the gap 22, there is capacitance not only between the resiliently deformable portions of the electrodes 14, 16, but also between the peripheral edge portions 15, 17 of the respective electrodes 14, 16.

A dielectric fluid, for example, air or some other dielectric gas, occupies the space in the gap 22 between the first and second electrodes 14, 16, which are both resiliently deformable in the example capacitive pressure transducer 10 in FIG. 1. When fluid pressure in the gap 22 is higher than the fluid pressure inside the first and second spaces 18, 20, the first resiliently deformable electrode 14 and the second resiliently deformable electrode 16 flex away from each other, which increases the distance D between them. On the other hand, when the fluid pressure in the gap 22 is lower than the fluid pressure inside the first and second spaces 18, 20, the first resiliently deformable electrode 14 and the second resiliently deformable electrode 16 flex toward each other, which decreases the distance D between them. For example, if the gap 22 is in fluid flow communication with an external space, e.g., the external space 34, in which pressure is to be measured, and if the first and second spaces 18, 20 are each hermetically sealed from such external space 34, an increase in pressure in the external space 34 will cause the distance D to increase, and a decrease in pressure in the external space will cause the distance D to decrease. The capacitance of the variable capacitor 22 formed by the first and second electrodes 14, 16 varies as a function of the distance D between the first and second electrodes 14, 16, which varies as a function of the fluid pressure in the space 22 outside of the hermetically sealed spaces 18, 20, e.g., as a function of the fluid pressure in the external space 34 in which pressure is to be measured. Such changes in the capacitance of the variable capacitor 22 can be detected and measured as a sensor output voltage $V_O$ (signal), which can be correlated empirically or otherwise to the pressure being measured as will be understood by persons skilled in the art. Other structures and arrangements for causing the first electrode 14, the second electrode 16, or both, to flex toward and away from each other can be provided as alternatives to the structures and arrangements described above, some of which alternatives will be discussed below.

Figure 3:
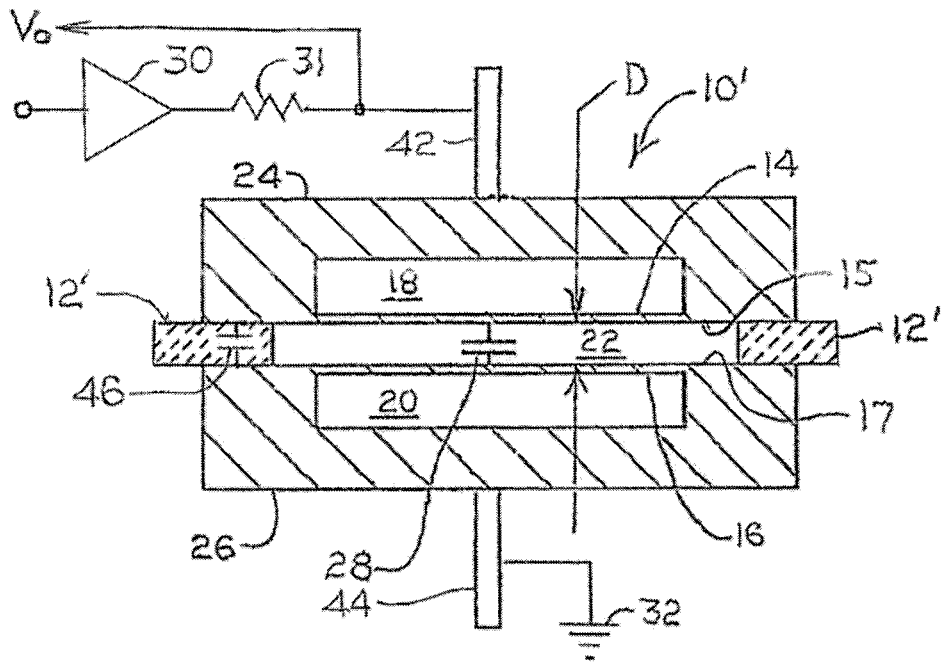
FIG. 3 is a diagrammatic view of an example capacitive pressure transducer with an insulator spacer, not an insulator-conductor-spacer, holding capacitive plates apart from each other.

The spacer 12 is positioned between the interfacing surfaces of the peripheral edge portions 15, 17 of the respective first and second electrodes 14, 16 to provide support for, and to maintain the gap 22 between, the electrodes 14, 16, and to provide structural stability to the capacitive pressure transducer 10. The spacer 12 illustrated in FIG. 1 is a layered insulator-conductor-insulator structure comprising an electrically conductive shield layer 36 sandwiched between a first electrically insulative layer 38 and a second insulative layer 40. For purposes of explaining the function and benefits of the insulator-conductor-insulator layer 12 in FIG. 1, a similar capacitive pressure transducer 10' is shown in FIG. 3, but with a solely insulative spacer 12' for contrast, i.e., without the electrically conductive shield layer 36. The diagrammatic views of FIGS. 1 and 3 are depicted as cross-sections of the respective capacitive pressure transducers 10, 10', so the spacers 12, 12' show on both the left and right sides of the capacitive pressure transducers 10, 10', even though each of the spacers 12, 12' may be a single spacer, for example, annular or other shape extending around the peripheral edge portions 15, 17 of the electrodes 14, 16. In the FIGS. 1 and 3 examples, the first and second housings 24, 26, including the first and second capacitor membrane plates 14, 16, are shown as electrically conductive metal with a first electrical conductor 42 connecting the voltage source 30 to the first electrically conductive housing 24 and a second electrical conductor 44 connecting the second electrically conductive housing 26 to ground 32, thereby forming the variable sensor capacitor 28 as explained above.

Figure 2:
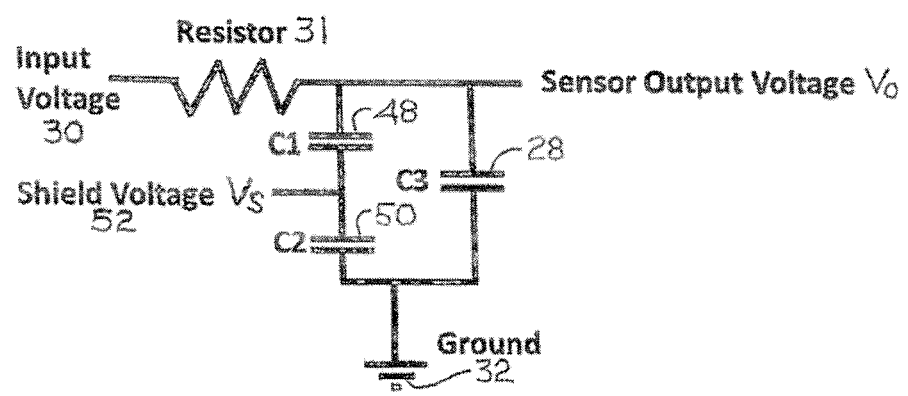
FIG. 2 is an equivalent RC circuit diagram illustrating how the driven shielding with the insulator-conductor-insulator spacer in FIG. 1 avoids parasitic capacitances in the sensing circuit of the capacitance pressure transducer in FIG. 1.
Figure 4:
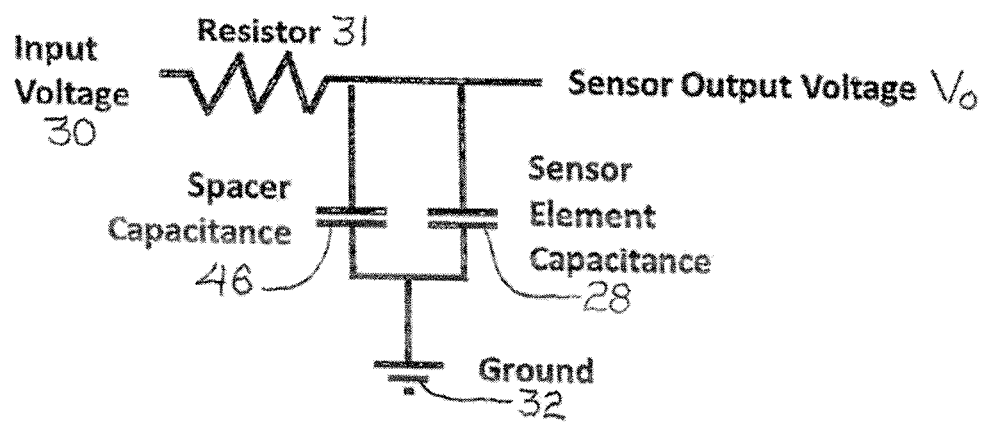
FIG. 4 is an equivalent RC circuit diagram illustrating parasitic capacitances in the pressure transducer of FIG. 3 due to the insulator spacer in contrast to the example FIG. 1 capacitive pressure transducer.

A problem with the example capacitive pressure transducer 10' in FIG. 3 is that the solely insulative spacer 12' has a dielectric constant positioned between the peripheral edge portions 15, 17 of the respective electrodes 14, 16 that contributes parasitically to the sensed capacitance changes in the resistor-capacitor (RC) circuit between the voltage source 30 and the ground 32, as illustrated by the equivalent RC circuit diagram in FIG. 4. The parasitic capacitance of the of the spacer 12' is illustrated diagrammatically in FIGS. 3 and 4 by the capacitor symbol 46 in parallel to the sensor capacitance 28. The capacitance changes in the RC circuit can be sensed as changes in the output voltage signal $V_O$. The resistor element 31 in FIGS. 2 and 4 is part of the resistance-capacitance (RC) circuit of the capacitive pressure transducer 10 or 10', although it may be located somewhere in the RC circuit that is not in close proximity to the capacitive pressure transducer 10 or 10', because heat and other environmental effects in which the capacitive pressure transducer 10 or 10' may be utilized can change its resistance value. A resistor element 31 made of high quality material that has a low thermal coefficient and low drift can enhance the stability of the RC circuit, thus the reliability and accuracy of pressure measurements with the capacitive pressure transducer. Also, many dielectric materials that are usable as spacers 12', especially in very high temperature applications, have dielectric constants that are highly dependent on temperature. For example, alumina-based ceramics have dielectric constants that are dependent on temperature, the dielectric constants of some purities of alumina being more temperature-dependent than others. As shown by the equivalent RC circuit in FIG. 4 for the capacitive pressure transducer 10' in FIG. 3, both the sensor capacitance 28 and the parallel parasitic capacitance 46 contribute to the output voltage $V_O$ signal, thus to pressure measurements from the capacitive pressure transducer 10'. Since the parasitic capacitance 46 is temperature-dependent, as explained above, the accuracy of the pressure transducer output signal $V_O$ is degraded by temperature variations that affect the parasitic capacitance 46.

The layered insulator-conductor-insulator spacer 12 in the example variable capacitive transducer 10 in FIG. 1 solves that problem. As illustrated in FIG. 1, the layered insulator-conductor-insulator spacer 12 creates two separate capacitances in the variable capacitive transducer 10 in addition to the sensor capacitance 28, i.e., a capacitance indicated by capacitor symbol 48 across the first electrically insulative layer 38 between peripheral edge portion 15 of the first electrode 14 and the electrically conductive shield layer 36, and another capacitance indicated by capacitor symbol 50 across the second electrically insulative layer 40 between the conductive shield layer 36 and the peripheral edge portion 17 of the second electrode 16. Also, a shield voltage $V_S$ that is essentially the same magnitude as the sensor output (signal) voltage $V_O$ at all points in time is applied to the conductive shield layer 36 of the layered spacer 12. Therefore, as illustrated by the equivalent circuit diagram in FIG. 2, there is no effective voltage across the first spacer layer 38, thus essentially no current flow through the first spacer layer capacitance 48. With no current flow through the first spacer layer capacitance 48, the first spacer layer capacitance 48 does not affect the RC circuit, including the sensor output voltage signal $V_O$. Also, since there is essentially zero current flow through the first spacer layer capacitance 48, any current flow through the second spacer layer capacitance 50 is only between the shield voltage source 52 and ground 32, which does not add to, or subtract from, the parallel current flow through the sensor capacitance 28, thus also does not affect the sensor output voltage signal $V_O$. Accordingly, the shield voltage $V_S$ applied to the electrically conductive shield layer 36 essentially isolates first spacer layer capacitance 48 and the second spacer layer capacitance 50 from the RC circuit and the output voltage signal $V_O$, leaving essentially only the sensor capacitance 28 to affect the transducer voltage output signal $V_O$. Therefore, the transducer voltage output signal $V_O$ is essentially not affected by parasitic capacitances in the spacer 12. "Essentially" as used in this context recognizes that real electronic devices are not ideal and that there are practical considerations and limits regarding attempts to approach ideal so that any variation from ideal or theoretical absolute in these parameters and conditions is small enough to be inconsequential or acceptable in the pressure measurements for which the capacitive pressure sensor 10 is applied or used.

While a shield voltage $V_S$ that results in the transducer voltage output signal $V_O$ being essentially not affected by parasitic capacitances in the spacer 12 as explained above is desirable in many applications, any shield voltage $V_S$ applied to the conductive shield layer 36 that reduces the current flow through the first spacer layer capacitance 48 will reduce parasitic capacitances in the RC circuit of the capacitive pressure transducer 10 at least to some extent, which may be useful and sufficient for some applications. Therefore, for some applications, an alternate embodiment capacitance pressure transducer may have a shield voltage $V_S$ that creates a voltage difference between the conductive shield layer and one of the two electrodes, for example the first electrode 14, that is less than or more than the sensor voltage $V_O$ across the two electrodes 14, 16, even if the shield voltage $V_S$ is not essentially equal to the sensor voltage $V_O$.

Voltage and current sources in myriad designs and configurations are well-known in the art, and persons skilled in the art will know how to design and build input and shield voltage sources for this application, including shield voltage sources that provide voltages essentially equal in magnitude to sensor output voltages at all points in time, once they become familiar with the principles of the layered insulator-conductor-insulator spacer 12 in the example variable capacitive transducer 10 described above and in the example implementations described below. While not necessary for a person skilled in the art to understand, make, or use the capacitive pressure transducer 10 with the layered insulator-conductor-insulator spacer 12 in the examples described above and below, a function block diagram of a simple example circuit for providing the input voltage and current for the RC circuit and the shield voltage $V_S$ is shown in FIG. 1. In this example, the input voltage and current for the RC circuit is provided by first operational amplifier 30, which is provided with an input signal and which provides a voltage and current output to the resistor 31 of the RC circuit. The input signal could, but does not necessarily have to, be a sinusoidal signal. A non-periodic signal could also be used. The RC circuit provides an output voltage signal $V_O$, which is measurable and indicative of pressure on the electrodes 14, 16 as explained above. The output voltage signal $V_O$ also drives a second operational amplifier 52 that is set up to produce a shield voltage $V_S$ with essentially the same magnitude as the output voltage signal $V_O$ of the RC circuit at all points in time. Persons skilled in the art know how to design such operational amplifiers and set-ups or myriad other circuits that can produce such shield voltage $V_S$ outputs with whatever parameters or waveforms may be appropriate for a particular implementation.

It is appropriate to mention at this point that according to the Ideal Gas Law, when gas is held at a given pressure, the volume of the gas is directly proportional to the temperature of the gas. Therefore, for a given pressure in the spaces 18, 20, an increase in temperature will cause the volume of the spaces 18, 20 to increase, thus pushing the first and second resiliently deformable electrodes 14, 16 toward each other, even without a change in pressure in the gap space 22, thereby decreasing the sensor capacitance 28. Likewise, for a given pressure in the spaces 18, 20, a decrease in temperature will cause the volume of the spaces 18, 20 to decrease, thus pulling the first and second resiliently deformable electrodes 14, 16 away from each other, even without a change in pressure in the gap space 22. Such effects of sensor capacitance 28, thus effects on output voltage signal $V_O$ due to temperature changes, are not related to the temperature effects on voltage output $V_O$ signal due to parasitic capacitances in the spacer 12' in FIG. 3 discussed above, e.g., dielectric constants of spacer materials that are highly dependent on temperature. Instead, such Ideal Gas Law effects of temperature on volume, thus capacitance, can be determined empirically, and the sensor capacitance 28 measurements can be compensated in a manner that provides accurate pressure measurements, regardless of temperature. For example, a temperature sensor (not shown), such as a K-type, alumel and chromel thermocouple pair or a resistance temperature detector (RTD), can be positioned adjacent to the capacitive pressure transducer 10 to measure temperature, which can be used to establish the relationship between the capacitance measurements and temperature measurements and then to make temperature compensating corrections in the pressure measurements according to principles and with analog or digital circuits that are conventional and understood by persons skilled in the art.

Figure 8:
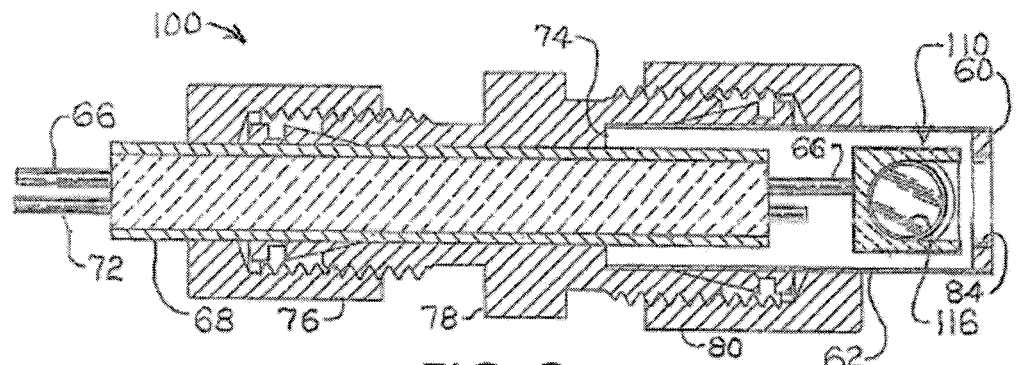
FIG. 8 is a cross-section view of the example pressure transducer in FIGS. 5, 6, and 7 taken along the section plane 8-8 in FIG. 7.
Figure 9:
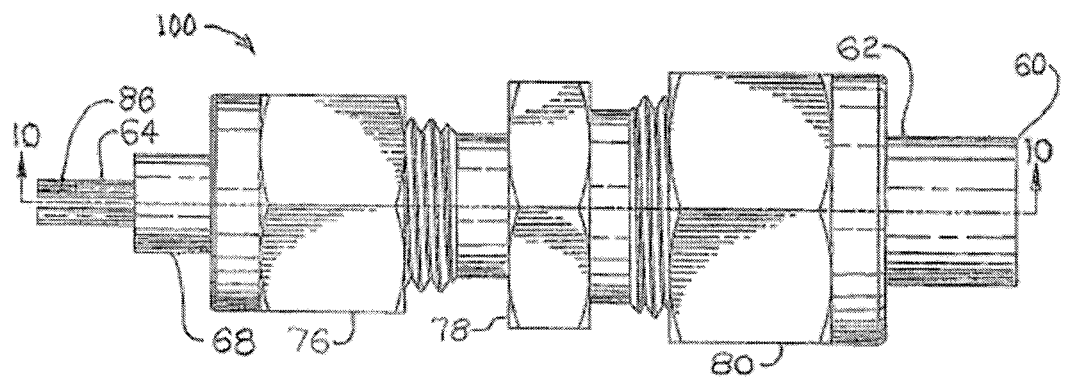
FIG. 9 is a top plan view of the example pressure transducer in FIGS. 5, 6, and 7.
Figure 10:
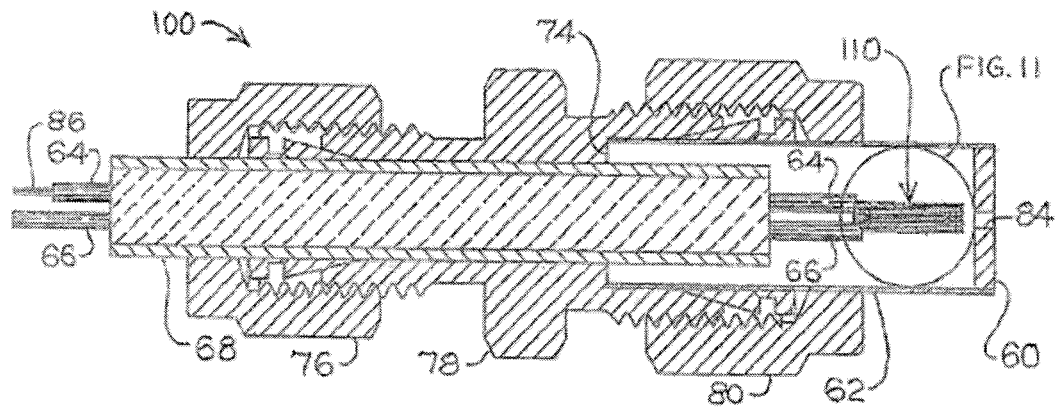
FIG. 10 is a cross-section view of the example pressure transducer in FIGS. 5, 6, 7 and 9 taken along the section plane 10-10 in FIG. 9.

An example implementation of a capacitive pressure transducer with a layered insulator-conductor-insulator spacer to essentially eliminate parasitic capacitances as described above is illustrated in an example variable capacitive pressure sensor 100 in FIGS. 5-13. With reference initially to FIGS. 8 and 10 and with secondary reference for context to FIGS. 5-7 and 9, a capacitive pressure transducer 110 is mounted in and adjacent to the distal end 60 of the pressure sensor 100. The capacitive pressure transducer 110 is mounted on and supported in a casing 62 of the pressure sensor 100 by electrical wires 64, 66, which also form parts of the capacitive sensor circuit as will be described in more detail below. The capacitive pressure transducer 110 can also be secured in the casing 62 with an electrically insulative cement or other electrically insulative material (not shown) for durability and ruggedness of the assembly. A 4-conductor cable 68 comprising the two electric wires 64, 66 and two additional electric wires 70, 72 extends into the proximal end 74 of the casing 62 with the capacitive pressure transducer 110 mounted on the two electric wires 64, 66. The two additional wires 70, 72 can be used for a temperature sensor (not shown) for temperature compensation as mentioned above. The casing 62 and the cable 68 can be mounted and supported in any convenient manner that is appropriate for whatever temperature and other environmental conditions in which the capacitive pressure sensor 100 is to be used. In the example illustrated in FIGS. 5-13, a commercially available reducing tube union, e.g., Swagelok (trademark) PN SS 600-6-4BT, comprised of fittings 76, 78, 80, is used to mount the casing 62, the cable 68, and capacitive pressure transducer 110, although other parts or combination of parts could be used. A distal end plate 82 with an orifice 84 encloses the distal end 60 of the casing 62 while the orifice 84 allows fluid-flow communication of the interior of the casing 62 with air or other gas outside of the casing 62 so that the capacitive pressure transducer 110 in the casing 62 is exposed to the air or other gas outside the casing 62.

Figure 11:
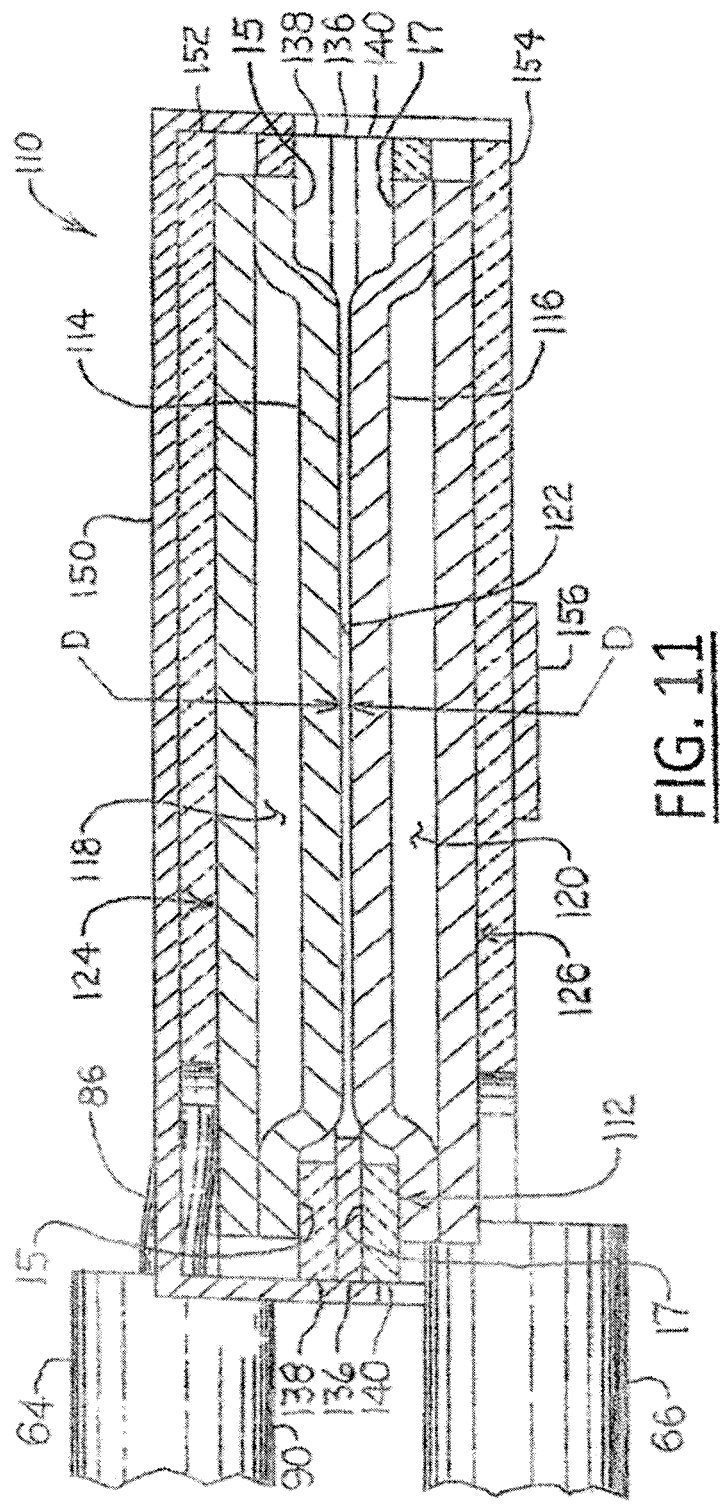
FIG. 11 is an enlarged cross-section view of the capacitive pressure transducer of the example capacitive pressure transducer in FIGS. 5, 6, 7 and 9 illustrated in FIG. 10.
Figure 12:
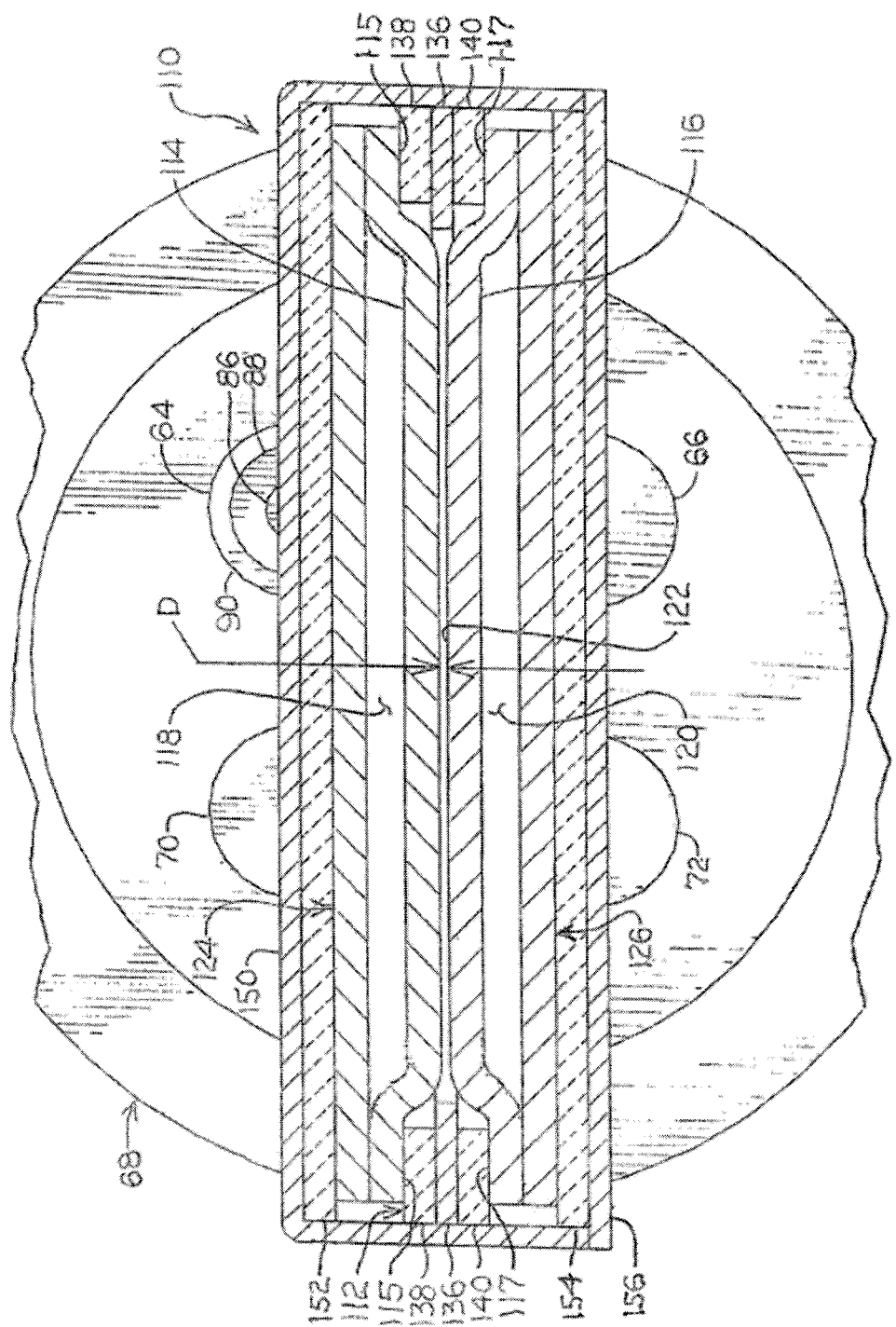
FIG. 12 is an enlarged cross-section view of the of the capacitive pressure transducer of the example capacitive pressure transducer illustrated in FIGS. 10 and 11, but taken along the section plane 12-12 in FIG. 7.
Figure 13:
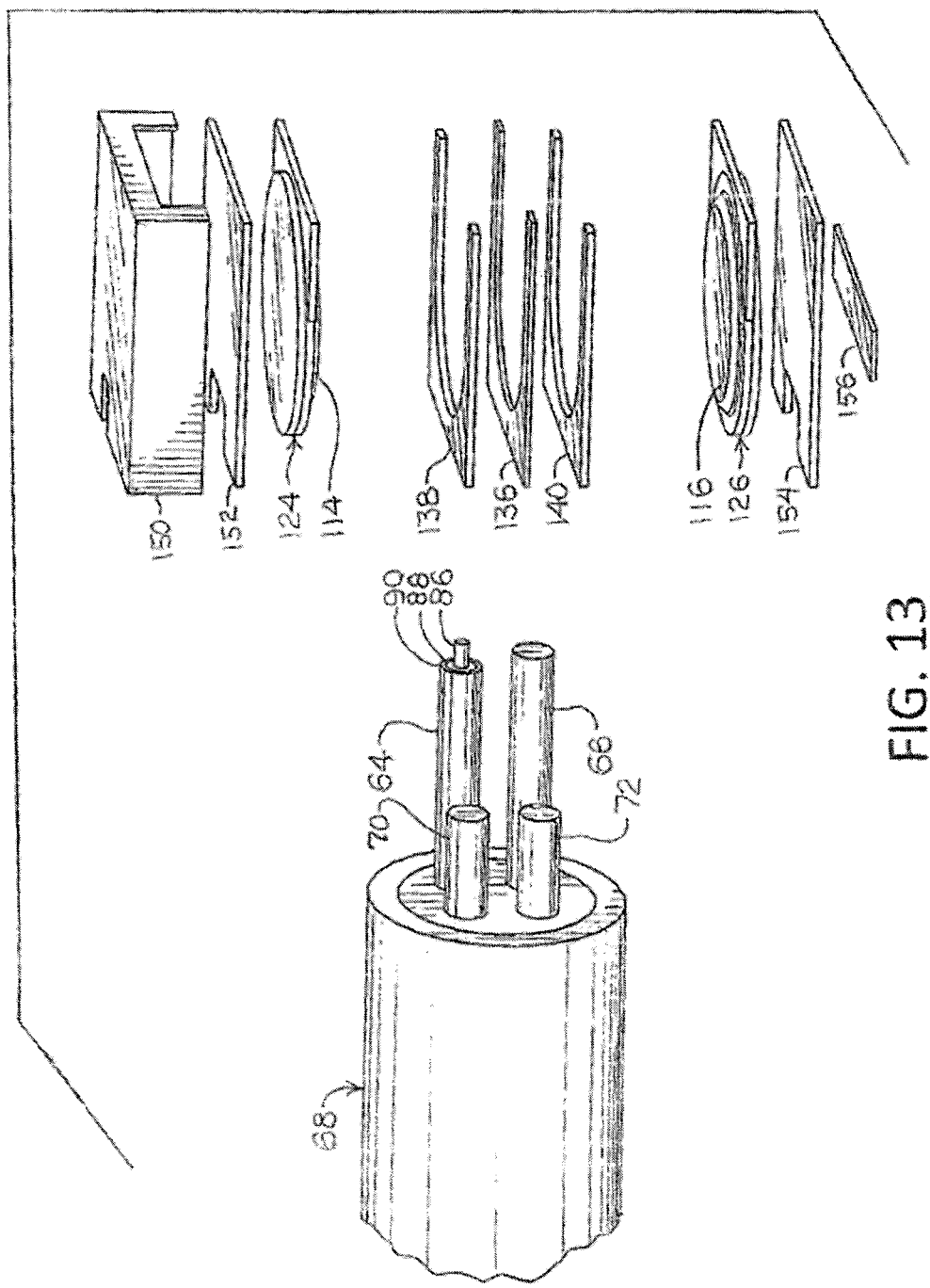
FIG. 13 is an exploded view of the capacitive pressure transducer shown in FIGS. 10, 11, and 12.
Figure 14:
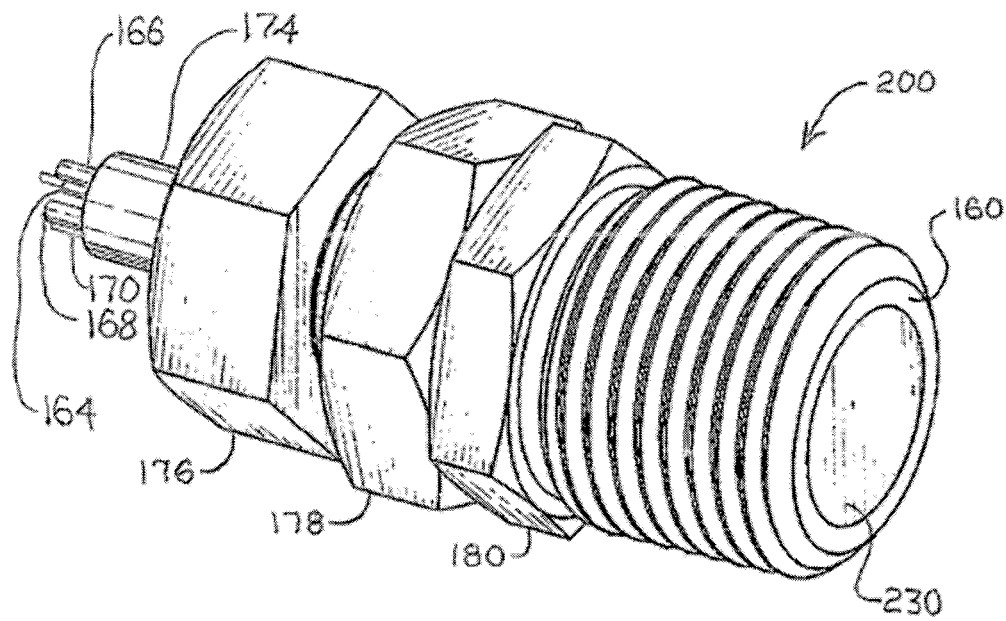
FIG. 14 is an isometric view of another example capacitive pressure transducer equipped with an insulator-conductor-insulator spacer as illustrated diagrammatically in FIG. 1.
Figure 15:
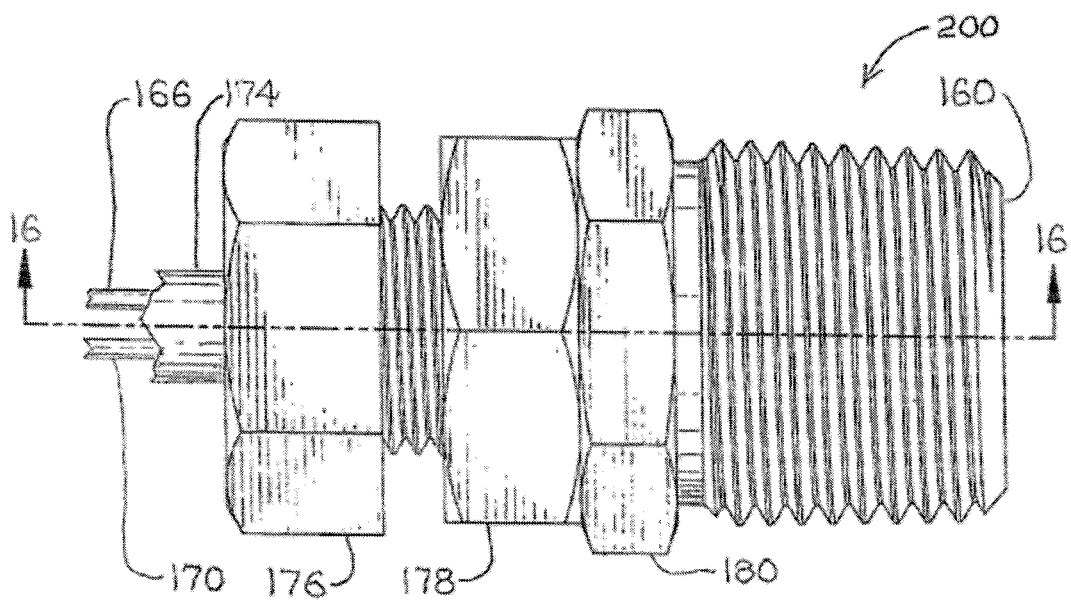
FIG. 15 is a top plan view of the example capacitive pressure transducer in FIG. 14.

Referring now primarily to FIGS. 11-13, the capacitive pressure transducer 110 comprises a first housing 124 enclosing a first space 118 and a second housing 126 enclosing a second space 120. One side of the first housing 124 comprises a first resiliently deformable electrode 114, and one side of the second housing 126 comprises a second resiliently deformable electrode 116. The first and second housings 124, 126 are positioned adjacent to each other with the first and second electrodes 114, 116 facing each other in close proximity to each other to provide a gap 122 with a variable distance D between them. The first and second electrodes 114, 116 are electrically conductive material, e.g., electrically conductive metal, that is elastically resilient, so that they are flexible toward and away from each other to function as a variable capacitor in the manner described above in relation to the example capacitive pressure transducer 10 in FIGS. 1 and 2.

A layered insulator-conductor-insulator spacer 112 is provided to hold the first and second electrodes 114, 116 apart from each other and to provide driven voltage shielding to essentially eliminate, parasitic capacitances in the spacer 112 between the marginal edge portions 115, 117 of the respective first and second housings 124, 126 as explained above in relation to the diagrammatic example capacitive pressure transducer 10 in FIGS. 1 and 2. The spacer 112 comprises an electrically conductive shield layer 136 sandwiched between a first electrically insulative layer 138 and a second electrically insulative layer 140. As best seen in FIGS. 11 and 13, the conductive shield layer 136, first insulative layer 138, and second insulative layer 14 are horseshoe shaped to surround most, but not all, of the first and second housings 124, 126 so that the gap space 122 between the electrodes 114, 116 is open and in fluid-flow communication with the interior of the casing 62 (FIGS. 5-10), thus also in fluid-flow communication with the exterior of the capacitive pressure sensor 110 through the orifice 84. The open ends of the horseshoe shaped layers 136, 138, 140 are oriented toward the orifice 84 to be aligned with pressure waves coming through the orifice 84 to maximize the response time and sensitivity of the capacitive pressure transducer 110 to fast dynamic pressure changes.

An optional metal shield box 150 is placed over the first and second housings 124, 126 to remove parasitic capacitances with any component outside of the metal shield box 150. A first electrically insulative sheet 152 is positioned between the top of the metal shield box 150 and the first housing 124. A similar, second electrically insulative sheet 154 is positioned between the second housing 126 and a metal tie bar 156, which extends from one side of the metal shield box 150, under the second insulative sheet 154, and to the opposite side of the metal shield box 150 to hold the stack of components that comprise the capacitive pressure transducer 110 together.

As mentioned above, the capacitive pressure transducer 110 is mounted on the first wire 64 and the second wire 66, which also form part of the capacitance sensing circuit for the capacitive pressure sensor 100. As best seen in FIGS. 5 and 10-13, the sensor voltage $V_O$ and the driven shield voltage $V_S$ are provided with an optional first wire 64 that is a shielded wire, e.g., a coax cable, comprising a center conductor wire 86 surrounded by an electrical insulative material 88, which is surrounded by and electrically conductive metal shield, e.g., a metal mesh or sleeve 90. Referring now primarily to FIG. 11, the center conductor wire 86 of the shielded wire 64 is connected to the first housing 124 and carries the sensor voltage signal $V_O$ between a sensor voltage and current source (see sensor voltage and current source 30 in FIGS. 1 and 2) and the electrically conductive housing 124, including the first electrode 114 of the capacitive pressure transducer 110. The electrically conductive metal shield 90 of the shielded wire 64 carries the shield voltage $V_S$ from a shield voltage source (see the shield voltage source 52 in FIGS. 1 and 2) to the electrically conductive metal shield layer 136 of the spacer 112. The second wire 66 is connected to the electrically conductive metal second housing 126, including the second electrode 116 to connect the electrode 116 electrically to ground (see ground 32 in FIGS. 1 and 2). Accordingly, the center conductor wire 86 of the shielded wire 64 and the second wire 66 connected respectively to the first housing 124 and to the second housing 126 form part of the capacitive pressure sensor RC circuit, and the electrically conductive shield sleeve 90 of the shielded wire 64 forms part of the shield circuit (see FIGS. 1 and 2). The sensor voltage $V_O$ and the driven shield voltage $V_S$ could be provided by two separate wires instead of the shielded first wire 64, although the shielded wire does provide some advantages as will be explained below. Essentially, the conductive shield sleeve 90 connected to the shield voltage source 52 not only provides the shield voltage $V_S$ to the electrically conductive shield layer 136 of the spacer 112, but also essentially eliminates parasitic capacitances between the center conductor wire 86 and surrounding electrically conductive components, including the ground wire 66, for essentially the entire length of the shielded wire 64. The second wire 66 can be a solid, stranded, or braided electrically conductive wire.

Also, to essentially eliminate parasitic capacitances in the spacer 112, the electrically conductive metal shield 90 of the shielded wire 64 is connected to a shield voltage $V_S$ generating circuit (see the shield voltage generating circuit 52 in FIGS. 1 and 2) and is connected electrically via the electrically conductive metal shield box 150 to the metal conductive shield layer 136 of the spacer 12. As explained above, the shield voltage $V_S$ is supplied essentially equal in magnitude to the sensor voltage $V_O$ at all points in time, but from a different voltage source, which essentially eliminates the parasitic capacitances in the spacer 12, as explained above in relation to the example diagrammatic capacitive pressure transducer 10 in FIGS. 1 and 2, and which also eliminates parasitic capacitances with any component outside metal shield box 150. As mentioned above, use of the shielded wire 64 with the center conductor wire 86 to provide the sensor voltage $V_O$ and the metal shield 90 of the shielded wire 64 to provide the shield voltage $V_S$ is optional, but it avoids parasitic capacitances in the cable 68 and other wires.

The third wire 70 and the fourth wire 72 in the cable 68 can be used for a temperature transducer or sensor (not shown) to measure temperatures in the pressure sensor 100 for use in temperature compensation of pressure measurements obtained from the capacitive pressure transducer 110 as explained above. The third wire 70 and fourth wire 72 can accommodate a thermocouple temperature sensor (not shown) or a 2-wire resistance temperature detector (RTD) (not shown). More wires, e.g., a fifth wire and a sixth wire (not shown) could be provided along with the third and fourth wires 70, 72 to accommodate a 3-wire RTD or a 4-wire RTD for more accurate temperature sensing if desired. Such temperature sensors and temperature compensation techniques are well-known and need not be explained here.

Figure 16:
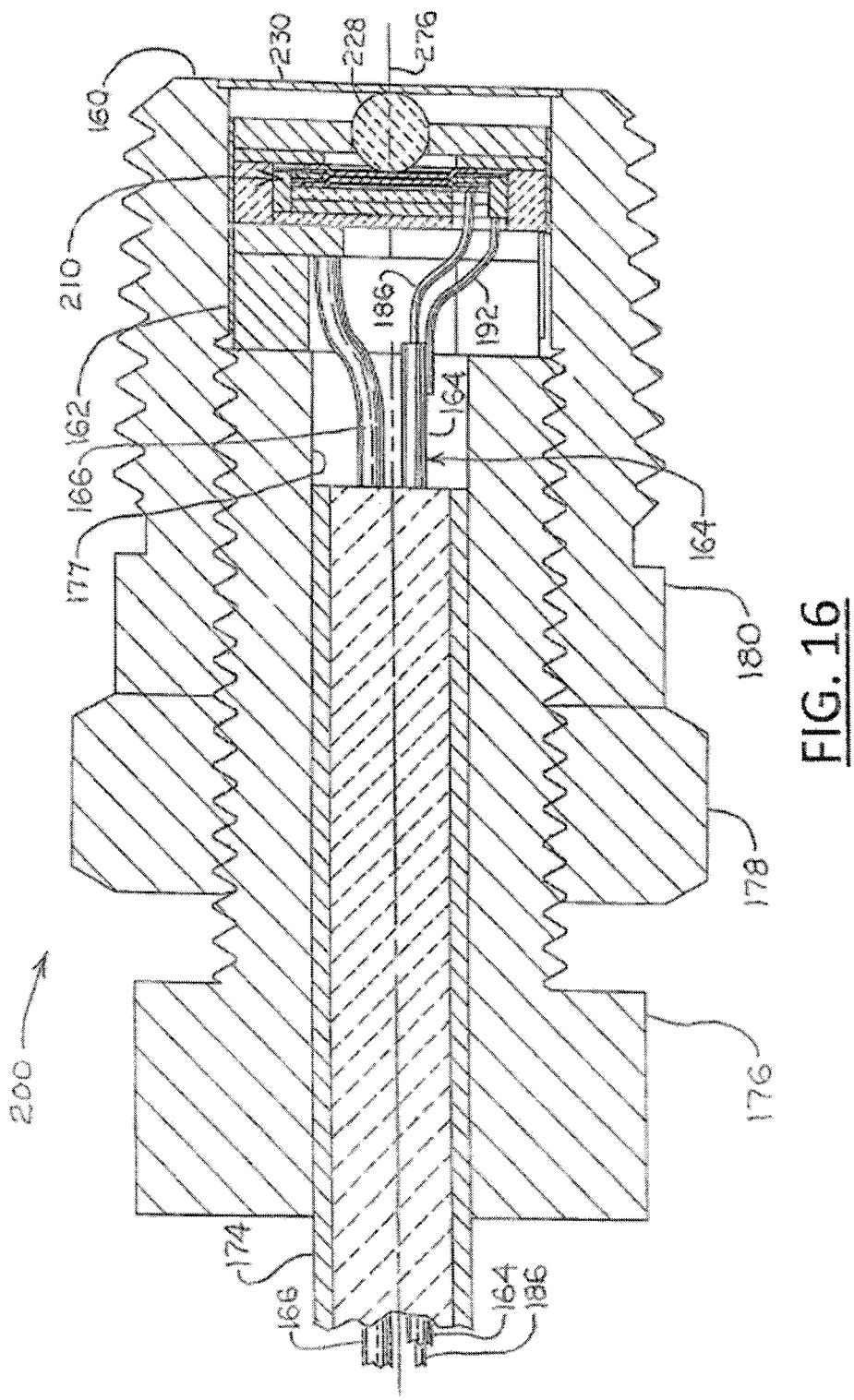
FIG. 16 is a cross-section view of the example capacitive pressure transducer in FIGS. 14 and 15 taken along the section plane 16-16 in FIG. 15.

Another example embodiment of a capacitive pressure transducer with a layered insulator-conductor-insulator spacer to essentially eliminate parasitic capacitances between the electrodes is illustrated in an example variable capacitive pressure sensor 200 in FIGS. 14-18. With reference initially to FIG. 16 and with secondary reference for context to FIGS. 14 and 15, a capacitive pressure transducer 210 is mounted in and adjacent to the distal end 160 of the pressure sensor 200. The capacitive pressure transducer 210 is mounted in a cylindrical casing 162, which is mounted in and supported by pipe fittings 176, 178, 180. A 4-wire cable 174 extends from a proximal end of the pressure sensor 100 through a channel 177 in the pipe fitting 176 to the capacitive pressure transducer 210, where two of the wires, e.g., a first shielded wire 164 and a second wire 166 connect to the capacitive pressure transducer 210 as will be described in more detail below.

Figure 17:
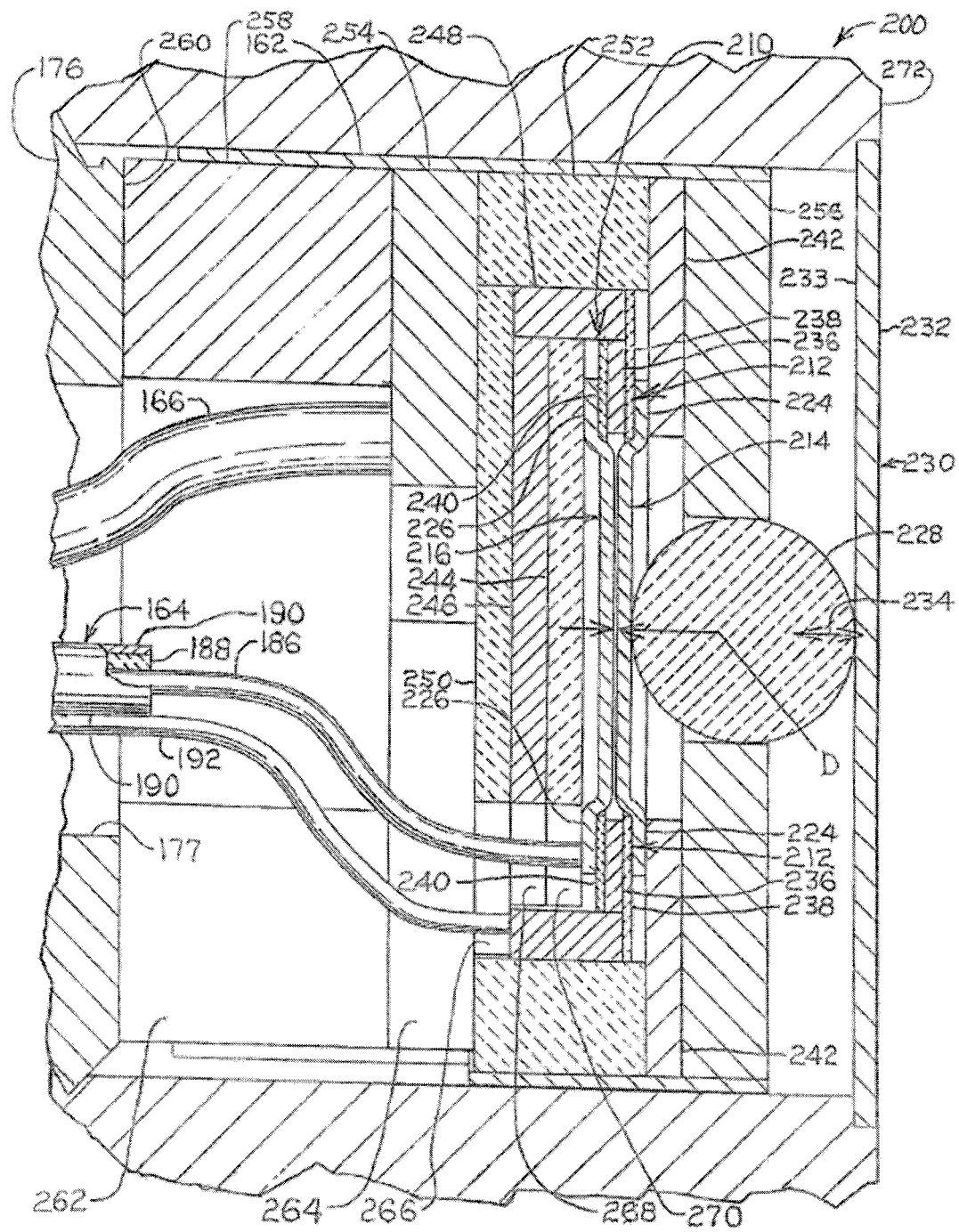
FIG. 17 is an enlarged cross-section view of the capacitive pressure transducer of the example capacitive pressure transducer in FIG. 16.
Figure 18:
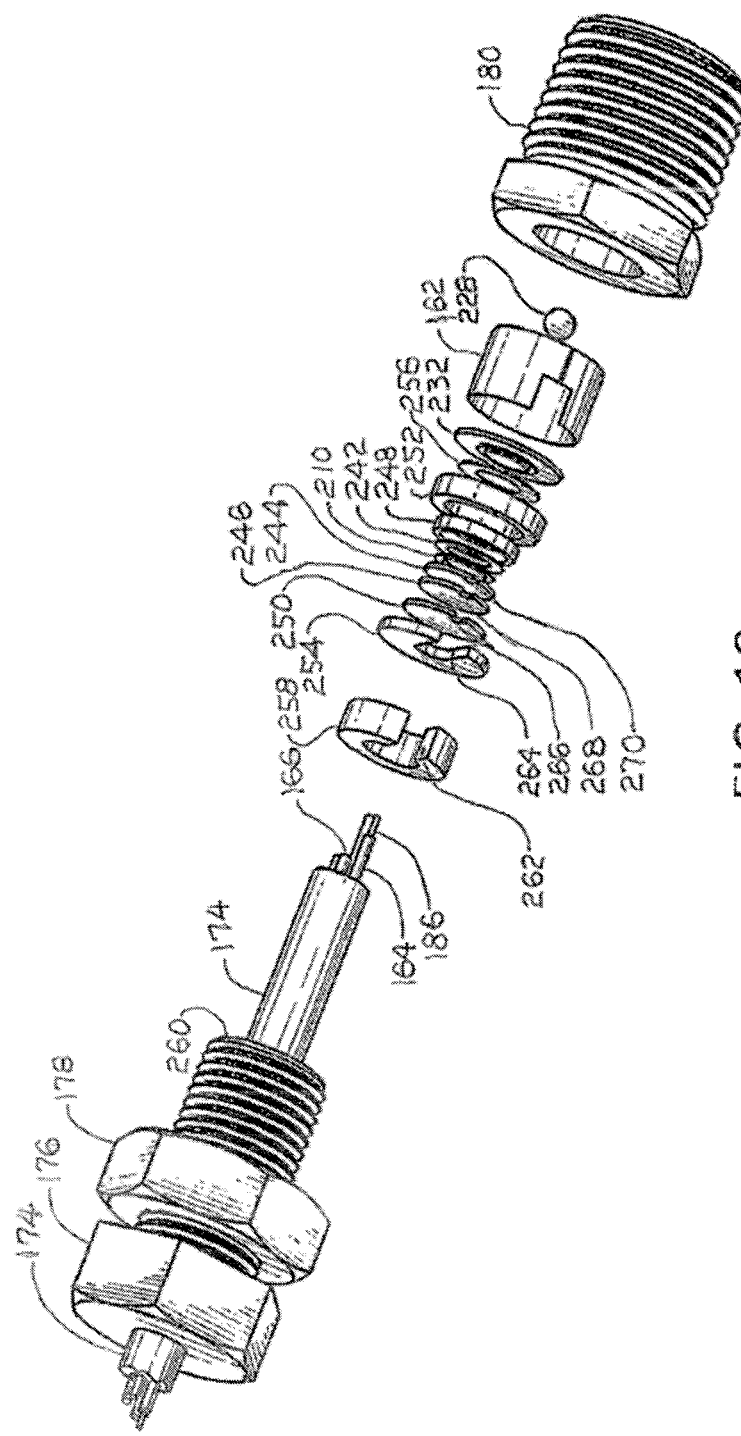
FIG. 18 is an exploded view of the example capacitive pressure transducer in FIGS. 14-17.

Referring now primarily to FIG. 17 with secondary reference to FIG. 18, the capacitive pressure transducer 210 comprises a pair of electrodes, e.g., a first electrode 214 and a second electrode 216, positioned adjacent to each other with a gap 222 between them. The first and second electrodes 214, 216 both comprise electrically conductive material, e.g., electrically conductive metal, so that they function as a capacitor when a voltage is applied across them. At least one of the pair of electrodes, for example, the first electrode 214, is resiliently deformable, so that it is flexible toward and away from the other electrode, e.g., the second electrode 216, to function as a variable capacitor. The other electrode of the pair, e.g., the second electrode 216, can be any sheet, plate, block, or other component that has an electrically conductive surface adjacent to the first electrode 214 to form the gap 222, although it can also be resiliently deformable. An annular spacer 212 between the peripheral edge portions 224 of the first electrode 214 and the peripheral edge portions 226 of the second electrode 216 maintains the gap 222, which is enough to accommodate flexure of the first capacitor membrane plate 214 through a range of pressures to be measured without reducing the variable distance D between the electrodes 214, 216 to zero.

As best seen in FIG. 17, a pusher component 228 is provided to push the resiliently deformable electrode 214 to flex toward the other electrode, e.g., toward the second electrode 216. The pusher component 228 is positioned between a resiliently deformable disk 230, which is mounted on and encloses the distal end 272 of the capacitive sensor 200, and the resiliently deformable electrode 214. When pressure on the external surface 232 of the disk 230 increases, the disk 230 flexes inwardly, bearing on the pusher component 228, to push the pusher component inwardly, against the resiliently deformable electrode 214, causing the resiliently deformable electrode 214 to flex toward the other electrode 216, which decreases the distance D between the two electrodes 214, 216 of the capacitive pressure transducer 210. Both the resiliently deformable disk 230 and the resiliently deformable electrode 214 resiliently flex back outwardly away from the second electrode 216 upon a decrease in pressure on the external surface 232 of the disk 230. Accordingly, the resiliently deformable electrode 214, the pusher component 228, and the resiliently deformable disk 230 move inwardly upon an increase in external pressure outside of the capacitive pressure sensor 200 and outwardly upon a decrease in external pressure, as indicated by the arrow 234 in FIG. 17.

The capacitive pressure transducer 212 is mounted in the casing 162 by a plurality of electrically conductive components, which make electrical connections for the sensor and shielding circuits of the capacitive pressure transducer 212, and by a plurality of electrically insulative components, which insulate certain electrically conductive components from other electrically conductive components as will be discussed in more detail below. As best seen in FIG. 17, the first and second electrodes 114, 116 of the capacitive pressure transducer 212, along with the annular spacer 212, is sandwiched between an annular, electrically conductive, collar 242 and an electrically insulative plate 244. An electrically conductive plate 246 is positioned against the electrically insulative plate 244. The capacitive pressure transducer 210, the spacer 212, the electrically insulative plate 244, and the electrically conductive plate 246 are assembled together and encased in an electrically conductive inner ring 248 and stacked together with an electrically insulative support plate 250. The electrically conductive inner ring 248 and the electrically insulative support are encased together in an electrically insulative outer ring 252, which is nested together with the electrically conductive collar 242 in the electrically conductive casing 162. The outer ring 252 along with the components encased in the outer ring 252 and the collar 242 are sandwiched between an electrically conductive support plate 254 and an electrically conductive distal end cap 256 in the casing 162. An annular spacer block 258 in the casing 162 abuts the distal end 260 of the pipe fitting 176 and the support plate 254 to position the assembly of the aforementioned components in the casing 162 and keep them immovable in the casing 162. Cutouts 262, 264, 266, 268, 270 in the respective spacer block 258, conductive support plate 254, insulative support plate 250, conductive plate 246, and insulative plate 244 facilitate routing the sensor voltage wire 186 and the shield voltage wire 192 to electrical connections for the capacitive pressure transducer 210 as will be explained in more detail below.

As best seen in FIG. 17, the annular spacer 212 is an insulator-conductor-insulator structure comprising an electrically conductive shield layer 236 sandwiched between a first electrically insulative layer 238 and a second electrically insulative layer 240. Sensor voltage $V_O$ is provided from a sensor voltage source 30 (see FIGS. 1 and 2) to the capacitive pressure transducer 210 through the center conductor wire 186 of the shielded wire 164, which can, but does not have to, be a coax cable. Shield voltage $V_S$ is provided from a shield voltage source 52 (see FIGS. 1 and 2) to the conductive shield layer 236 of the spacer 12 through the electrically conductive shield 190 of the shielded wire 164 and through the shield extension wire 192. The capacitive pressure transducer 210 is connected to ground 32 (see FIGS. 1 and 2) by a second wire 166. Specifically, in this example capacitive pressure sensor 200 illustrated in FIGS. 14-18, and as best seen in FIG. 17, the center conductor wire 186 of the shielded wire 164, which carries the sensor voltage $V_O$, is connected directly to the second electrode 216. The shield extension wire 192 is connected at one end to the electrically conductive shield 190 of the shielded wire 164 and at the other end to the electrically conductive inner ring 248, which is in physical and electrical contact with the electrically conductive shield layer 236 of the spacer 212. The ground wire 166 is connected to the electrically conductive support plate 254, which is in physical and electrical contact with the electrically conductive casing 162, which is in physical and electrical contact with the conductive collar 242, which is in physical and electrically conductive contact with the first electrode 214 of the capacitive pressure transducer 210. The physical and electrical contacts described above are secured as complete connections by joining the respective electrically conductive parts together with welding, brazing, soldering, electrically conductive adhesive, or other electrically conductive material. In this example arrangement, it is advantageous to have the shielded wire 164, including the coax shield sleeve 190, extend as close as possible to the first and second electrodes 214, 216 to minimize parasitic capacitances between the center conductor wire 186 and the surrounding grounded components, including the ground wire 166, the conductive support plate 254, and spacer block 258. Also, as illustrated in FIG. 17, the shield voltage $V_S$ is applied not only to the electrically conductive shield layer 236 in the spacer 212, but also to other electrically conductive components (e.g., the inner ring 248 and the conductive plate 246) that substantially surround the electrode 214 to which the sensor voltage $V_O$ is applied, to further minimize parasitic capacitances between the electrode 214 and grounded components. Therefore, the shield voltage $V_S$ not only essentially eliminates parasitic capacitances between the electrodes 214, 216 of the capacitive pressure sensor 210, but also minimizes, if not substantially eliminates, parasitic capacitances between the electrodes 204, 216 and surrounding components as well as between the center conductor wire 186 and the ground wire 166 and other surrounding components for essentially the entire length of the shielded wire 164.

As best seen in FIG. 17, the distal end 272 of the capacitive pressure sensor 200 is closed by the disk 230, which is elastic and resiliently deformable so that a higher pressure on the external surface 232 than the pressure on the inside surface 233 causes the disk 230 to flex inwardly toward the capacitive pressure transducer 210, and so that a lower pressure on the external surface 232 than the pressure on the inside surface 233 causes the disk 230 to flex outwardly away from the capacitive pressure transducer 210. The pusher component 228 (sometimes "pusher" for convenience) is a disk or ball that is captured in a hole 274 in the distal end cap 256 in a manner that allows the pusher 228 to only move longitudinally (i.e., along the longitudinal axis of the capacitive pressure sensor 200) toward and away from the capacitive pressure transducer 210 as indicated by the arrow 234. Therefore, when the pressure on the exterior surface 232 of the disk 230 is higher than the pressure on the inside surface 233, the disk 230 flexes inwardly and moves the pusher 228 toward the first electrode 214. When the pusher 228 is pushed by the disk 230 enough to flex the first electrode 214 toward the second electrode 216, i.e., to decrease the distance D between the first and second electrodes 214, 216, the sensor capacitance decreases. On the other hand, when the pressure on the exterior surface 232 of the disk 230 is lower than the pressure on the inside surface 233, the disk 230 flexes outwardly, which allows the inherent resilience of the first electrode 214 to move outwardly and to push the pusher 228 outwardly, which increases the distance D between the first and second capacitor membrane plates 214, 216 so that the sensor capacitance increases. To maintain the pusher 228 in constant contact with both the first electrode 214 and the disk 230 throughout a pressure range to be measured, an initial bias force can be provided on the pusher 228 by sizing the pusher 228 and spacing the first electrode 214 from the disk 230 in a manner that causes an initial deflection of the first electrode 214 toward the second electrode 216 at or near the middle of the pressure range so that flexing of the disk 230 outwardly when pressure is lower will not result in the pusher 228 losing contact with the first electrode 214. In this regard, with the capacitive pressure sensor 200 assembled as illustrated, for example, in FIG. 16 and with the capacitive pressure sensor operating, the spacing and bias force of the pusher 228 on the first electrode 214 can be adjusted while monitoring the sensor output voltage signal $V_O$ in real time by screwing the outer bushing fitting 180 on the inner bushing fitting 176 one way or the other (e.g., tighter or looser) to move the pusher 228 toward or away from the first electrode 214 until a desired output and performance is achieved. At that point, the lock nut fitting 178 can be tightened against the outer bushing fitting 180 to set the adjustment. To further secure the adjustment, the outer bushing fitting 180, the lock nut fitting 178, and the inner bushing fitting 176 can all be joined together permanently, e.g., by welding, brazing, adhesive, or other joining technique. Other parts, fittings, or arrangements could also be used for such mountings and for making such adjustments.

As mentioned above, persons skilled in the art know how to detect and measure the changes in capacitance with electronics (not shown) connected to the center conductor wire 186 of the coax cable 164 and how to correlate such measurements to pressure measurements. The disk 230 and the distal end cap 256 can, but do not have to, be electrically conductive. If those components are electrically conductive, the pusher 228 can be an electrically insulative material, e.g., ceramic or any dielectric material. As also explained above, a shield voltage $V_S$, which is equal to the sensor voltage $V_O$, applied to the conductive shield layer 236 of the spacer 212 essentially eliminates parasitic capacitances in the spacer 212 (see FIGS. 1 and 2 and related explanations).

The third wire 168 and the fourth wire 170 in the cable 174 can be used for a temperature transducer (not shown) to measure temperatures in the pressure sensor 200 for use in temperature compensation of pressure measurements obtained from the capacitive pressure transducer 210 as explained above. The third and fourth wires 168, 170 can accommodate a thermocouple temperature sensor (not shown) or a 2-wire resistance temperature detector (RTD). More wires, e.g., a fifth wire and a sixth wire (not shown) could be provided along with the third and fourth wires 168, 170 to accommodate a 3-wire RTD or a 4-wire RTD for more accurate temperature sensing if desired. Such temperature sensors and temperature compensation is well-known and need not be explained here.

The electrically conductive components can comprise any electrically conductive material that is feasible for a desired application or operating environment. Persons skilled in the art are familiar with a variety of electrically conductive materials with a variety of qualities and characteristics for conductivity, temperature suitability, corrosion resistance, and the like. Appropriate materials for electrical conductors 24, 25, 26, 27 in probes 12 that can withstand temperatures as high a 1,800° C. may include, for example, all platinum group metals, alloys comprising platinum (Pt) or rhodium (Rh), all refractory metals, e.g., niobium (Nb) or tungsten (W), alloys comprising refractory metals, e.g., molybdenum silicide (MoSi2), and very high temperature (VHT) polymer derived ceramics, e.g., SiBCN or SiAlCN. Other electrically conductive ceramics for the electrical conductors 24, 25, 26, 27 in probes 12 that can withstand temperatures as high as 1,800° C. may include lanthanum-based ceramics, titanium diboride (TiB2), titanium disilicide (TiSi2), refractory carbides or borides, indium tin oxide (ITO), conductive zirconia, or doped or undoped silicon carbonitride (SiCN). Gold (Au), silver (Ag), palladium (Pd), stainless steel, nickel, or nickel superalloys (e.g., Inconel, Hastalloy, etc.) are examples of metals that can be used for lower temperature applications, e.g., up to 1,000° C. Likewise, for the electrically insulative (dielectric) components described above, persons skilled in the art are familiar with a variety of electrically insulative (dielectric) materials that are suitable for a variety of applications and conditions, for example, ceramics (e.g., alumina, magnesia, or yttrium stabilized zirconia), single crystal materials (e.g., quartz or sapphire), amorphous materials, fused crystalline materials (e.g., fused silica, fused sapphire, etc.). For high temperature applications, the cables 68 and 174 can be mineral insulated cables.

The foregoing description provides examples that illustrate the principles of the invention, which is defined by the claims that follow. The capacitive pressure sensor embodiments and capacitive pressure transducer embodiments described above and shown in the drawings are examples, but not the only embodiments, that can be used with the insulator-conductor-insulator spacers shielding circuits described above. Once persons skilled in the art understand the principles of this invention, such person will recognize that still other embodiments can also be used. Since numerous insignificant modifications and changes will readily occur to those skilled in the art once they understand the invention, it is not desired to limit the invention to the exact example constructions and processes shown and described above. Accordingly, resort may be made to all suitable combinations, subcombinations, modifications, and equivalents that fall within the scope of the invention as defined by the claims. The words "comprise," "comprises," "comprising," "include," "including," and "includes" when used in this specification, including the claims, are intended to specify the presence of stated features, integers, components, or steps, but they do not preclude the presence or addition of one or more other features, integers, components, steps, or groups thereof.

The invention claimed is:

1. A method of shielding and avoiding parasitic capacitances in a variable capacitor pressure sensor in which two electrodes are positioned adjacent to each other with a gap between them, wherein at least one of the two electrodes is movable in relation to the other of the two electrodes, comprising:
   positioning a spacer between portions of the two electrodes, wherein the spacer comprises an electrically conductive shield layer sandwiched between a first electrically insulative layer and a second electrically insulative layer;
   covering the two electrodes with an electrically conductive shield box;
   applying a sensor voltage from a first voltage source across the two electrodes; and
   applying a shield voltage from a second voltage source, which is equal in magnitude to the sensor voltage at all points in time, to the electrically conductive shield layer and to the electrically conductive shield box.

* * * * *